United States Patent
Fridella et al.

(10) Patent No.: US 7,412,496 B2
(45) Date of Patent: Aug. 12, 2008

(54) MANAGEMENT OF THE FILE-MODIFICATION TIME ATTRIBUTE IN A MULTI-PROCESSOR FILE SERVER SYSTEM

(75) Inventors: Stephen A Fridella, Newton, MA (US); Gang Ma, Shrewsbury, MA (US); Xiaoye Jiang, Shrewsbury, MA (US); Sorin Faibish, Newton, MA (US); Rui Liang, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 1197 days.

(21) Appl. No.: 10/645,976

(22) Filed: Aug. 22, 2003

(65) Prior Publication Data

US 2005/0044080 A1    Feb. 24, 2005

(51) Int. Cl.
*G06F 15/16* (2006.01)
*G06F 15/173* (2006.01)

(52) U.S. Cl. .................. 709/219; 709/203; 709/217; 709/225; 709/229

(58) Field of Classification Search ................ 709/203, 709/217, 219, 224, 225, 229
See application file for complete search history.

(56) References Cited

U.S. PATENT DOCUMENTS

| | | | |
|---|---|---|---|
| 5,226,159 A | 7/1993 | Henson et al. | 395/650 |
| 5,734,898 A | 3/1998 | He | 395/619 |
| 5,852,747 A | 12/1998 | Bennett et al. | 395/860 |
| 5,940,841 A | 8/1999 | Schmuck et al. | 707/205 |
| 5,944,789 A | 8/1999 | Tzelnic et al. | 709/214 |
| 6,088,694 A | 7/2000 | Burns et al. | 707/8 |
| 6,192,408 B1 | 2/2001 | Vahalia et al. | 709/229 |
| 6,324,581 B1 | 11/2001 | Xu et al. | 709/229 |
| 6,687,735 B1 * | 2/2004 | Logston et al. | 709/203 |
| 7,139,811 B2 * | 11/2006 | Lev Ran et al. | 709/217 |
| 2002/0188667 A1 * | 12/2002 | Kirnos | 709/203 |
| 2004/0215746 A1 * | 10/2004 | McCanne et al. | 709/219 |

OTHER PUBLICATIONS

Cellera File Server in the E-Infostructure, EMC Corporation, Hopkinton, MA, 2000 (12 pages).
EMC Celerra HighRoad, EMC Corporation, Hopkinton, MA, Jan. 2002 (12 pages).
B. Callaghan et al., NFS Version 3 Protocol Specification, RFC 1813, Sun Microsystems, Inc., Jun. 1995, pp. 1-126.
S. Shepler et al., NFS Version 4 Protocol Specification, RFC 3530, Sun Microsystems, Inc., Apr. 2003, pp. 1-245.

* cited by examiner

*Primary Examiner*—Quang N. Nguyen
(74) *Attorney, Agent, or Firm*—Richard Auchterlonie; Novak Druce & Quigg, LLP

(57) ABSTRACT

To permit multiple unsynchronized processors to update the file-modification time attribute of a file during concurrent asynchronous writes to the file, a primary processor having a clock manages access to metadata of the file. A number of secondary processors service client request for access to the file. Each secondary processor has a timer. When the primary processor grants a range lock upon the file to a secondary, it returns its clock time (m). Upon receipt, the secondary starts a local timer (t). When the secondary modifies the file data, it determines a file-modification time that is a function of the clock time and the timer interval, such as a sum (m+t). When the secondary receives an updated file-modification time (mp) from the primary, if mp>m+t, then the secondary updates the clock time (m) to (mp) and resets its local timer.

50 Claims, 8 Drawing Sheets

MANAGEMENT OF THE FILE-MODIFICATION TIME ATTRIBUTE IN A MULTI-PROCESSOR FILE SERVER SYSTEM

BACKGROUND OF THE INVENTION

1. Field of the Invention

The present invention relates generally to data storage systems, and more particularly to network file servers. The present invention specifically relates to a file server system in which access to file attributes is shared among a number of processors.

2. Description of the Related Art

Network data storage is most economically provided by an array of low-cost disk drives integrated with a large semiconductor cache memory. A number of data mover computers are used to interface the cached disk array to the network. The data mover computers perform file locking management and mapping of the network files to logical block addresses of storage in the cached disk array, and move data between network clients and the storage in the cached disk array.

Data consistency problems may arise if concurrent client access to a read/write file is permitted through more than one data mover. These data consistency problems can be solved in a number of ways. For example, as described in Vahalia et al., U.S. Pat. No. 5,893,140 issued Apr. 6, 1999, entitled "File Server Having a File System Cache and Protocol for Truly Safe Asynchronous Writes," incorporated herein by reference, locking information can be stored in the cached disk array, or cached in the data mover computers if a cache coherency scheme is used to maintain consistent locking data in the caches of the data mover computers.

When a large number of clients are concurrently accessing shared read-write files, there may be considerable access delays due to contention for locks not only on the files but also on the file directories. One way of reducing this contention is to assign each file system to only one data mover assigned the task of managing the locks on the files and directories in the file system. This permits the data mover file manager to locally cache and manage the metadata for the files and directories of the file system. For example, as described in Xu et al., U.S. Pat. No. 6,324,581, issued Nov. 27, 2001, incorporated herein by reference, the data mover acting as the manager of a file grants a lock on the file and provides metadata of the file to another data mover servicing a client request for access to the file. Then the data mover servicing the client request uses the metadata to directly access the file data in the cached disk array.

It is desired to permit clients to have asynchronous writes to a file in accordance with version 3 of the Network File System (NFS) protocol, and concurrent write access and byte range locking to a file in accordance with version 4 of the NFS protocol. (See NFS Version 3 Protocol Specification, RFC 1813, Sun Microsystems, Inc., June 1995, incorporated herein by reference, and NFS Version 4Protocol Specification, RFC 3530, Sun Microsystems, Inc., April 2003, incorporated herein by reference.) In this case, it is possible for a file to be updated at about the same time by multiple clients. The NFS protocol specifies that the time of last update of a file should be indicated by a file-modification time attribute, referred to in the protocol as "mtime."

SUMMARY OF THE INVENTION

In accordance with one aspect, the invention provides a method of operation in a file server system. The file server system has a clock for producing a clock time and a processor for servicing client requests for access to a file. The processor has a timer for measuring a time interval. The method includes the processor obtaining the clock time from the clock, and beginning measurement of the time interval with the timer. The method further includes the processor responding to a request from a client for an asynchronous write to the file by performing an asynchronous write operation with respect to the file, and determining a file-modification time that is a function of the clock time having been obtained from the clock and the time interval measured by the timer, the file-modification time indicating a time of modification of the file by the asynchronous write operation.

In accordance with another aspect, the invention provides a method of operation in a file server system having a first processor and a second processor for servicing client requests for access to a file. The first processor has a clock producing a clock time, and the second processor has a timer for measuring a time interval. The method includes the second processor responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modification time indicating a time of modification of the file by the first asynchronous write operation. The method further includes the secondary processor responding to a second request from the client for an asynchronous write to the file by performing a second asynchronous write operation with respect to the file, and determining a second file-modification time that is a function of the clock time obtained from the clock of the first processor and the time interval measured by the timer. The second file-modification time indicates a time of modification of the file by the second asynchronous write operation.

In accordance with yet another aspect, the invention provides a method of operation in a file server system having a first processor and a second processor for servicing client requests for access to a file. The first processor has a clock producing a clock time, and the second processor has a timer for measuring a time interval. The method includes the second processor responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modification time indicating a time of modification of the file by the first asynchronous write operation. The method further includes the second processor receiving from the first processor an updated value for the file-modification time, the second processor comparing the updated value for the file-modification time to the first file-modification time, and upon finding that the updated value for the file-modification time is greater than the first file-modification time, the second processor resetting the timer. Moreover, the method further includes the second processor responding to a second request from the client for an asynchronous write to the file by performing a second asynchronous write operation with respect to the file, and determining a second file-modification time that is a function of the updated value for the file-modification time and the time interval measured by the timer. The second file-modification time indicates a time of modification of the file by the second asynchronous write operation.

In accordance with yet another aspect, the invention provides a method of operation in a file server system having a primary processor managing metadata of a file, and a secondary processor responding to requests from a client for access to the file. The primary processor has a clock producing a clock time, and the secondary processor has a timer for measuring a time interval. The method includes the secondary processor responding to a first asynchronous write request from the client for writing to the file by obtaining attributes of the file and the clock time from the primary processor, storing the attributes of the file in a cache local to the secondary processor and using the file attributes to perform a first asynchronous write operation with respect to the file, beginning measurement of the time interval with the timer, and using the clock time as a first file-modification time indicating a time of modification of the file by the first asynchronous write operation. The method further includes the secondary processor responding to a second asynchronous write request from the client for writing to the file by using the attributes of the file in the cache local to the secondary processor to perform a second asynchronous write operation with respect to the file, and determining a second file-modification time that is a function of the clock time having been obtained from the clock of the primary processor and the time interval measured by the timer, the second file-modification time indicating a time of modification of the file by the second asynchronous write operation.

In accordance with still another aspect, the invention provides a method of operation in a network file server. The network file server has a plurality of data mover computers for servicing client requests for access to a file, and a cached disk array for storing data of the file. The data mover computers are coupled to the cache disk array for accessing the data of the file. The data mover computers include a primary data mover computer managing metadata of the file, and a secondary data mover computer that requests metadata of the file from the primary data mover computer. The primary data mover computer has a clock producing a clock time, and the secondary data mover computer has a timer for measuring a time interval. The method includes the secondary data mover computer responding to a first asynchronous write request from a client for writing to the file by obtaining attributes of the file and the clock time from the primary data mover computer, storing the attributes of the file in a cache local to the secondary data mover computer and using the file attributes to perform a first asynchronous write operation with respect to the file, beginning measurement of the time interval with the timer, and using the clock time as a first file-modification time indicating a time of modification of the file by the first asynchronous write operation. The method further includes the secondary data mover computer responding to a second asynchronous write request from the client for writing to the file by using the attributes of the file in the cache local to the secondary data mover computer to perform a second asynchronous write operation with respect to the file, and determining a second file-modification time as a function of the clock time having been obtained from the primary data mover and the time interval measured by the timer, the second file-modification time indicating a time of modification of the file by the second asynchronous write operation.

In accordance with another aspect, the invention provides a file server system having a clock for producing a clock time and a processor for servicing client requests for access to a file. The processor has a timer for measuring a time interval. The processor is programmed for obtaining the clock time from the clock, and beginning measurement of the time interval with the timer. The processor is further programmed for responding to a request from a client for an asynchronous write to the file by performing an asynchronous write operation with respect to the file, and determining a file-modification time that is a function of the clock time having been obtained from the clock and the time interval measured by the timer, the file-modification time indicating a time of modification of the file by the asynchronous write operation.

In accordance with another aspect, the invention provides a file server system including a first processor and a second processor for servicing client requests for access to a file. The first processor has a clock for producing a clock time, and the second processor has a timer for measuring a time interval. The second processor is programmed for responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modification time indicating a time of modification of the file by the first asynchronous write operation. The second processor is programmed for responding to a second request from the client for an asynchronous write to the file by performing a second asynchronous write operation with respect to the file, and determining a second file-modification time that is a function of the clock time obtained from the clock of the first processor and the time interval measured by the timer, the second file-modification time indicating a time of modification of the file by the second asynchronous write operation.

In accordance with yet another aspect, the invention provides a file server system including a first processor and a second processor for servicing client requests for access to a file. The first processor has a clock for producing a clock time, and the second processor has a timer for measuring a time interval. The second processor is programmed for responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modification time indicating a time of modification of the file by the first asynchronous write operation. The second processor is further programmed for receiving from the first processor an updated value for the file-modification time, for comparing the updated value for the file-modification time to the first file-modification time, and upon finding that the updated value for the file-modification time is greater than the first file-modification time, resetting the timer. Moreover, the second processor is further programmed to respond to a second request from the client for an asynchronous write to the file by performing a second asynchronous write operation with respect to the file, and determining a second file-modification time that is a function of the updated value for the file-modification time and the time interval measured by the timer, the second file-modification time indicating a time of modification of the file by the second asynchronous write operation.

In accordance with still another aspect, the invention provides a file server system including a primary processor managing metadata of a file, and a secondary processor responding to requests from a client for access to the file. The primary processor has a clock for producing a clock time, and the secondary processor has a timer for measuring a time interval. The secondary processor is programmed for responding to a first asynchronous write request from the client for writing to the file by obtaining attributes of the file and the clock time from the primary processor, storing the attributes of the file in a cache local to the secondary processor and using the file attributes to perform a first asynchronous write operation with respect to the file, and beginning measurement of the time interval with the timer. The secondary processor is further programmed for responding to a second asynchronous write request from the client for writing to the file by using the attributes of the file in the cache local to the secondary processor to perform a second asynchronous write operation with respect to the file, and determining a file-modification time that is a function of the clock time from the primary processor and the time interval measured by the timer, the file-modification time indicating a time of modification of the file by the second asynchronous write operation.

In accordance with a final aspect, the invention provides a network file server including a plurality of data mover computers for servicing client requests for access to a file, and a cached disk array for storing data of the file. The data mover computers are coupled to the cache disk array for accessing the data of the file. The data mover computers include a primary data mover computer programmed for managing metadata of the file, and a secondary data mover computer programmed for requesting metadata of the file from the primary data mover computer. The primary data mover computer has a clock for producing a clock time, and the secondary data mover computer has a timer for measuring a time interval. The secondary data mover computer is programmed for responding to a first asynchronous write request from a client for writing to the file by obtaining attributes of the file and the clock time from the primary data mover computer, storing the attributes of the file in a cache local to the secondary data mover computer and using the file attributes to perform a first asynchronous write operation with respect to the file, beginning measurement of the time interval with the timer, and using the clock time as a first file-modification time indicating a time of modification of the file by the first asynchronous write operation. The secondary data mover computer is further programmed for responding to a second asynchronous write request from the client for writing to the file by using the attributes of the file in the cache local to the secondary data mover computer to perform a second asynchronous write operation with respect to the file, and determining a second file-modification time indicating a time of modification of the file by the second asynchronous write operation.

BRIEF DESCRIPTION OF THE DRAWINGS

Other objects and advantages of the invention will become apparent upon reading the following detailed description with reference to the accompanying drawings wherein.

Figure 1:
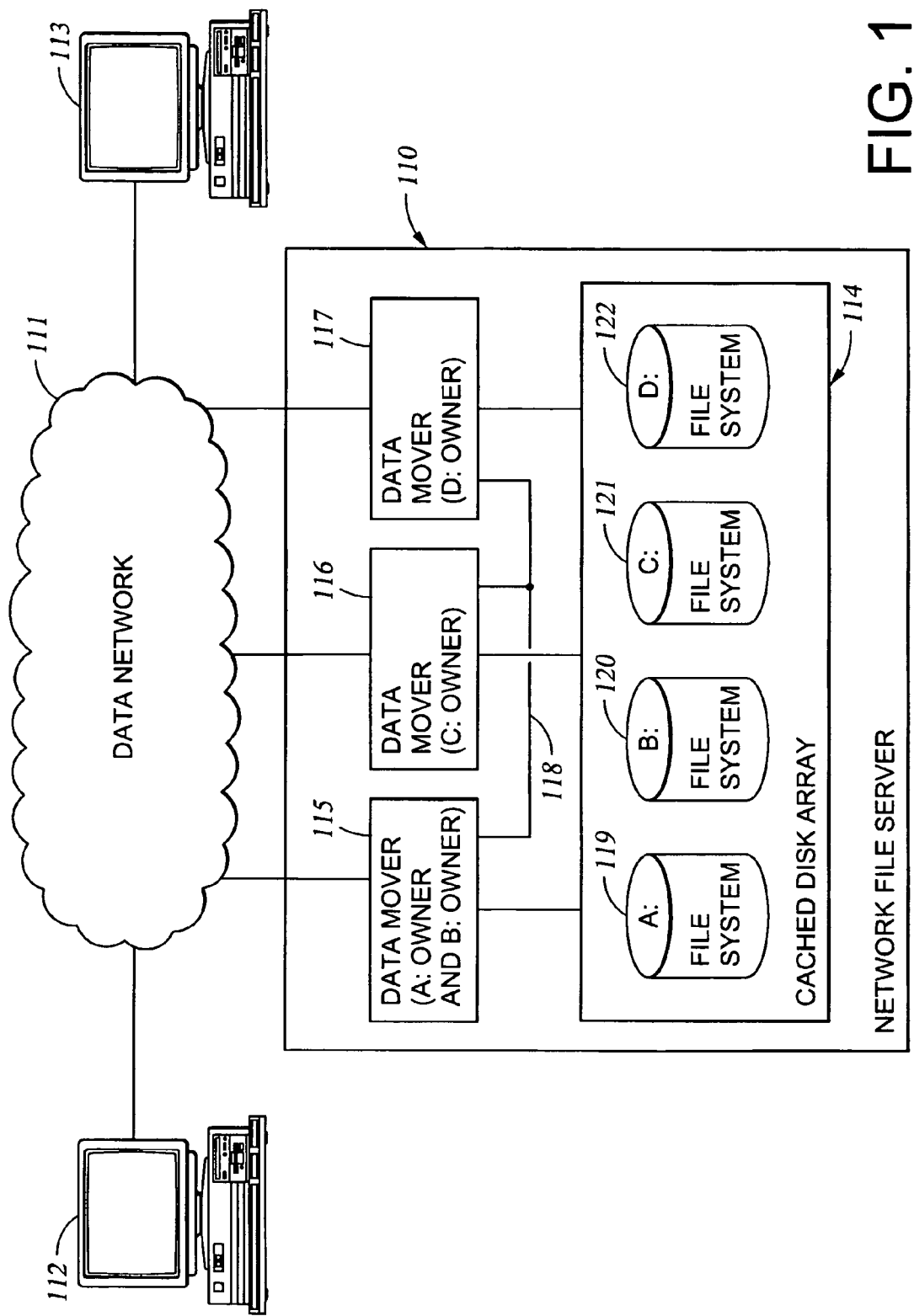
FIG. 1 is a block diagram of a data processing system including a network file server having multiple data mover computers, each of which manages a respective file system.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

In a data storage network, it is desirable to provide client access to a file system through more than one processor servicing client requests. FIG. 1, for example, shows a network file server that uses distributed locking and permits storage resources to be incrementally added to provide sufficient storage capacity for any desired number of file systems. The network file server includes multiple data mover computers 115, 116, 117, each of which manages a respective file system. Each data mover computer also functions as a file server for servicing client requests for access to the file systems. For this purpose, each data mover computer 115, 116, 117 has a respective port to a data network 111 having a number of clients including work stations 112, 113. The data network 111 may include any one or more network connection technologies, such as Ethernet, and communication protocols, such as TCP/IP or UDP. The work stations 112, 113, for example, are personal computers.

The preferred construction and operation of the network file server 110 is further described in Vahalia et al., U.S. Pat. No. 5,893,140 issued Apr. 6, 1999, incorporated herein by reference. The network file server 110 includes a cached disk array 114. The network file server 110 is managed as a dedicated network appliance, integrated with popular network operating systems in a way, which, other than its superior performance, is transparent to the end user. The clustering of the data movers 115, 116, 117 as a front end to the cached disk array 114 provides parallelism and scalability. Each of the data movers 115, 116, 117 is a high-end commodity computer, providing the highest performance appropriate for a data mover at the lowest cost. The data movers may communicate with each other over a dedicated dual-redundant Ethernet connection 118. The data mover computers 115, 116, and 117 may communicate with the other network devices using standard file access protocols such as the Network File System (NFS) or the Common Internet File System (CIFS) protocols, but the data mover computers do not necessarily employ standard operating systems. For example, the network file server 110 is programmed with a Unix-based file system that has been adapted for rapid file access and streaming of data between the cached disk array 114 and the data network 111 by any one of the data mover computers 115, 116, 117.

In the network file server of FIG. 1, the locking information for each file system 119, 120, 121, 122 is managed exclusively by only one of the data movers 115, 116, 117. This exclusive relationship will be referred to by saying each file system has a respective data mover that is the owner of the file system. For example, the data mover 115 is the owner of the A: file system 119 and the B: file system 120, the data mover 116 is the owner of the C: file system 121, and the data mover 117 is the owner of D: file system 122. The owner of a file system is said to be primary with respect to the file system, and other data movers are said to be secondary with respect to the file system.

In the network file server 110, each client 112, 113 may access any of the file systems through any one of the data mover computers 115, 116, 117, but if the data mover computer servicing the client does not own the file system to be accessed, then a lock on at least a portion of the file system to be accessed must be obtained from the data mover computer that owns the file system to be accessed.

In network file server 110, it is possible for a write operation to change the attributes of a file, for example, when the extent of a file is increased by appending data to the file. When a write operation will change the metadata of a file, the metadata must be managed in a consistent fashion, in order to avoid conflict between the data mover owning the file, and the data mover performing the write operation. For example, as described in the above-cited Xu et al., U.S. Pat. No. 6,324,581, when a secondary data mover performs a write operation that changes the metadata of a file, the new metadata is written to the primary data mover. This ensures that the primary data mover maintains consistent metadata in its cache.

It is desired to permit multiple clients to have concurrent asynchronous writes to a file in accordance with version 3 and version 4 of the Network File System (NFS) protocol. Locking can be based on ranges of blocks within the same file. For example, the primary data mover may grant one client a write lock on blocks 100 to 199 in a file, and the primary data mover may grant another client a concurrent write lock on blocks 200 to 299 in the same file.

It is desirable for some of the file system metadata to be cached only on the primary data mover, and some of the file system metadata to be cached on the primary and secondary data movers. For example, the file system metadata is broken into three categories: directory information, inodes and indirect blocks, and file attributes. For the first two categories, all block allocations are performed on the primary data mover, and all directory-related NFS requests are serviced on this same primary data mover. However, file attributes are cached on the secondary data movers to prevent the primary data mover from becoming a bottleneck for read-only access to the file attributes.

When multiple clients are permitted to write to the same file concurrently, it becomes difficult to maintain the file-modification time attribute. Normally, when a file attribute applicable to the entire file needs to be changed, the change is made at the cache of the primary data mover, and the caches of the secondary data movers are invalidated. The clocks of the data movers 115, 116, 177 are not synchronized. Therefore, to update the file-modification time in a consistent fashion, a secondary data mover could send a file-modification time request to the primary data mover, and the primary data mover could read its clock to obtain a new update time, and then return the new update time to the secondary data mover. Unfortunately this method would be quite burdensome, because messages would have to be passed between the primary and secondary data movers for each asynchronous write to a file system. In contrast, the file-creation time attribute (ctime) can simply be set with the clock time of the primary data mover since a file is always created by its primary data mover, and the file-creation time does not change during the life of the file.

The file-modification time attribute must be maintained in a consistent fashion. In particular, the file-modification time attribute must satisfy three important consistency requirements. First, when a client writes to a file, the file-modification time should increase. Second, the file-modification time should never decrease. Third, the file-modification time of a file should not change unless data has actually been written to the file.

Consistency of the file-modification time attribute is critical to the performance of NFS client side caching mechanisms as well as time-based applications such as incremental backup, and "make" during program compilation. If the first or second consistency requirements are violated, then applications such as incremental backup and "make" will become confused. If the third consistency requirement is violated, then NFS clients may invalidate their cached file data unnecessarily, adversely affecting performance.

It has been discovered that it is possible for the secondary data movers to update the file-modification time attribute in a consistent fashion without always accessing the primary data mover clock. The clocks of the primary and secondary data movers need not be synchronized. The secondary clocks cannot simply be used to set the file-modification time attribute, because the clock skew between the multiple secondary data movers writing to the same file would violate the second consistency requirement. On the other hand, the primary clock cannot simply be used unless the file-modification time is updated for each asynchronous write. Otherwise, the third consistency requirement would be violated during the gap between the time of the asynchronous write and the update of the file-modification time. However, it is possible for a secondary data mover to update the file-modification time attribute in a consistent fashion using a hybrid method that computes the file-modification time attribute based on the clock of the primary data mover and a timer of the secondary data mover. The updated file-modification time is a function of the clock time obtained from the clock of the primary data mover and a time interval measured by the timer of the secondary data mover. Preferably, the function is a sum of the clock time obtained from the clock of the primary data mover and a time interval measured by the timer of the secondary data mover.

Figure 2:
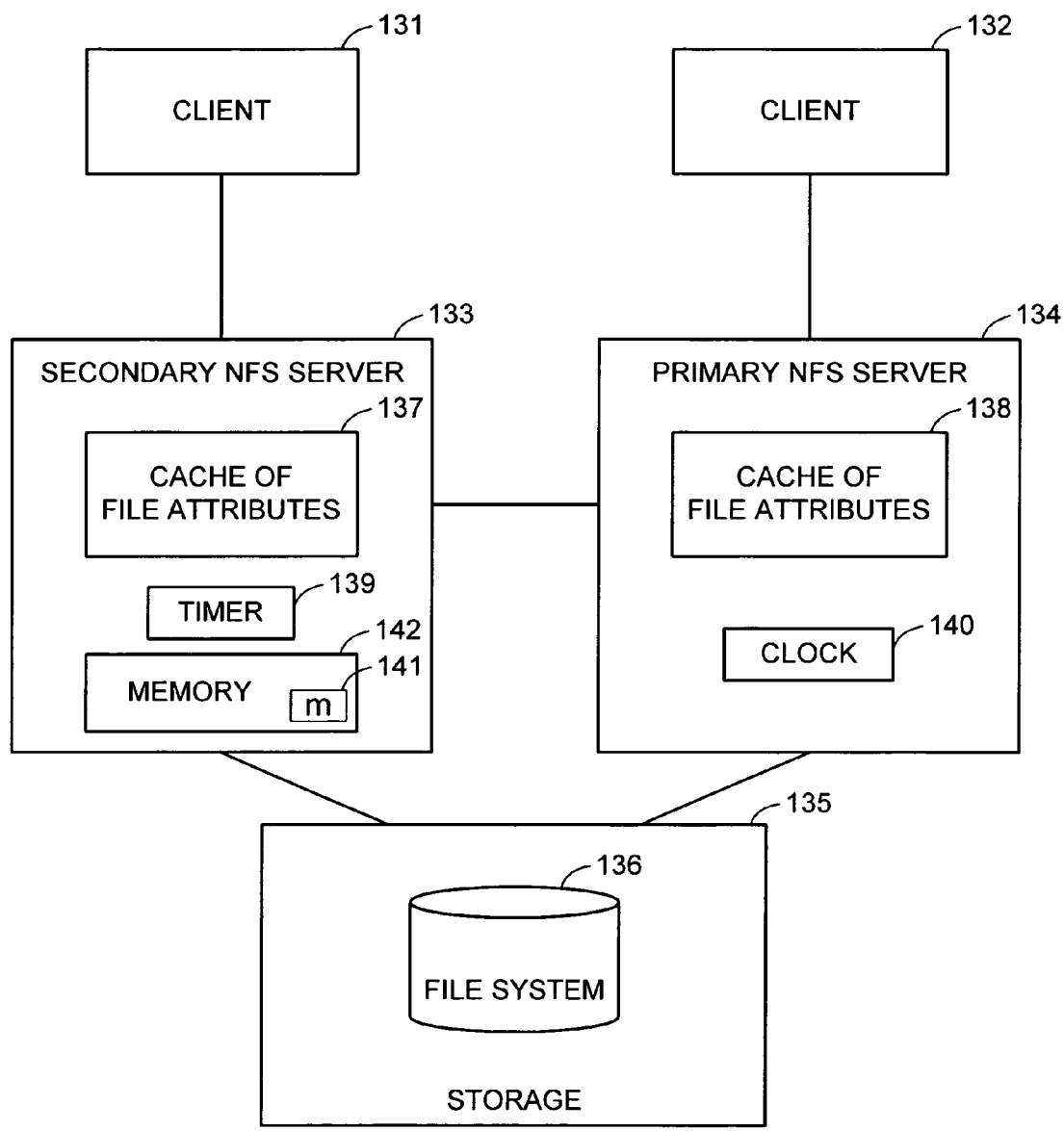
FIG. 2 is a block diagram of a primary NFS server and a secondary a NFS server in a file server system such as the network file server of FIG. 1.

As shown in FIG. 2, a first client 131 is serviced by a secondary NFS server 133, and a second client 132 is serviced by primary NFS server 134. The secondary NFS server 133 and the primary NFS server 134 are connected to storage 135 for access to a file system 136 in the storage. For example, the NFS servers are data movers, and the storage 135 is provided by a cached disk array, as described above. The secondary NFS server 133 has a local cache of file attributes 137, and the primary NFS server 134 has a local cache of file attributes 138. The secondary NFS server 133 has a timer 139, and the primary NFS server 140 has a clock 140. The clock 140, for example, is a real-time clock used by the operating system of the primary NFS server for placing a date-time stamp on its local files. The timer 139 is a random access memory location that is periodically incremented by a timer interrupt routine.

When an NFS server performs an asynchronous write for a client, the server returns an updated file-modification time attribute (mtime). If the NFS server is the primary NFS server 134, the updated-file-modification time can simply be the time of its local clock 140. If the NFS server is the secondary NFS server 133, then the updated file-modification time is the sum of the local timer 139 and a local value (m) 141 of the primary clock having been stored in local memory 142 of the secondary NFS server 133. In particular, when a secondary 133 obtains file attributes from the primary 134 for a first write to a file, the secondary receives the present value of the primary clock 140, and stores the present value (m) 141 in local memory 142. At this time, the secondary resets its timer

139. The secondary 133 maintains a respective timer 139 and stored clock time (m) 141 for each file that it has opened for asynchronous write access.

When the secondary NFS server 133 performs a second asynchronous write to the file system 136 for the client 131, it computes an updated file-modification time (m1) by adding the stored clock time (m) 141 and the present value of its timer 139, and returns the file-modification time (m1) to the client 133. When the secondary NFS server 133 performs a commit operation by flushing data for the file to the file system 136 in storage 135, the secondary NFS file server sends the updated file-modification time (m1) to the primary NFS file server 134. The primary NFS file server then writes the updated file-modification time (m1) to its local cache, and also sends the updated file-modification time (m1) to all of the other secondaries that are caching the attributes of the file system 136.

Figure 3:
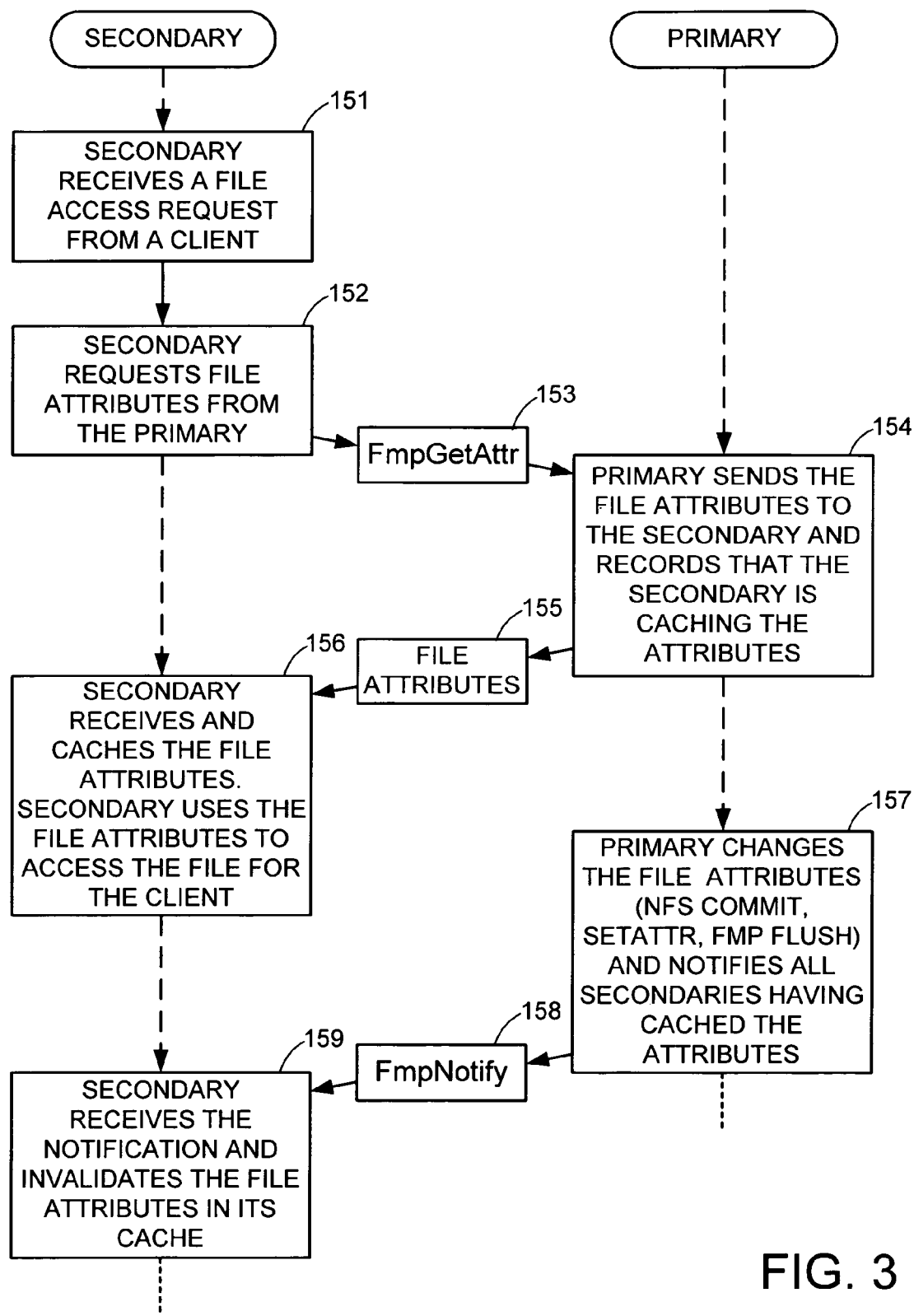
FIG. 3 is a flowchart of a file attribute caching protocol between the primary NFS server and the secondary NFS server of FIG. 2.

FIG. 3 shows the preferred file management protocol (FMP) between the primary NFS server and the secondary NFS server of FIG. 2. This protocol is designed to permit the exchange of file metadata between primary and secondary servers that cache the file metadata, as described in Xu et al., U.S. Pat. No. 6,324,581, issued Nov. 27, 2001, incorporated herein by reference. This protocol eliminates the need for the secondary to communicate with the primary every time that the secondary responds to an NFS read or write request from a client. In order to maintain consistency of the file attributes, the primary NFS server notifies each secondary (that caches attributes for the file) whenever there is a change in the attributes for the file. This allows the secondary to invalidate its cache of file attributes and to refresh its cache with new attribute data from the primary. In particular, in a first step 151, the secondary receives a file access request from a client. In step 152, the secondary requests file attributes from the primary. The secondary does this by sending a "FmpGetAttr" request 153 to the primary (over the link 118 in FIG. 1).

In step 154, the primary responds to the "FmpGetAttr" request from the secondary by sending the file attributes 154 to the secondary and recording that the secondary is caching the file attributes. In effect, the secondary is requesting a lock on a range of file blocks, and if the primary can grant the range lock, then the primary returns the file attributes applicable to the range of file blocks. The file attributes applicable to the range of file blocks include the mapping of the logical file blocks to the logical storage blocks in the storage (135 in FIG. 2). The primary may also return some file attributes that apply to the entire file, such as the file's group ID, owner, file size, file-modification time (mtime) and file-creation time (ctime). In step 156 the secondary receives and caches the file attributes. The secondary uses the file attributes to access the file for the client. In particular, the secondary uses the mapping of the logical file blocks to the logical storage blocks to read or write directly to the file system (136 in FIG. 2) in the storage (135 in FIG. 2).

Some time later, in step 157, the primary changes the file attributes, and notifies all secondaries having cached the file attributes by sending a "FmpNotify" message 158. Normally, this happens only on an explicit setAttr, NFS commit, or FMP flush. Therefore, an NFS asynchronous write by the client of one secondary will not result in an attribute change visible to clients of another secondary. The attribute changes will be visible only after a client issues an NFS commit. (This will result in the secondary issuing an FMP flush.) This is consistent with NFS semantics. In step 159, the secondary receives the notification, and invalidates the file attributes in its cache.

Figure 4:
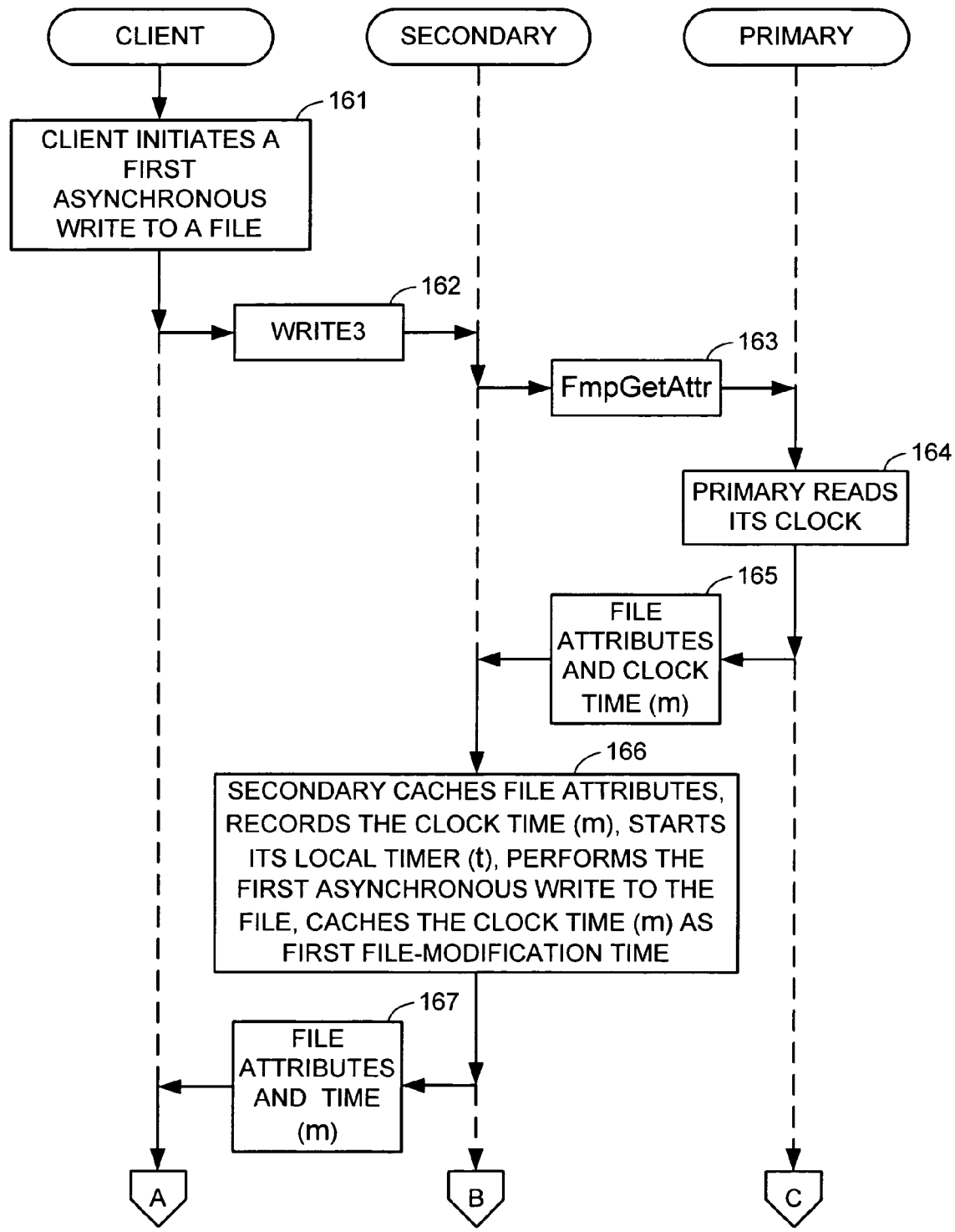
FIGS. 4 to 6 comprise a flowchart showing management of the file-modification time attribute during the file attribute caching protocol of FIG. 3.
Figure 5:
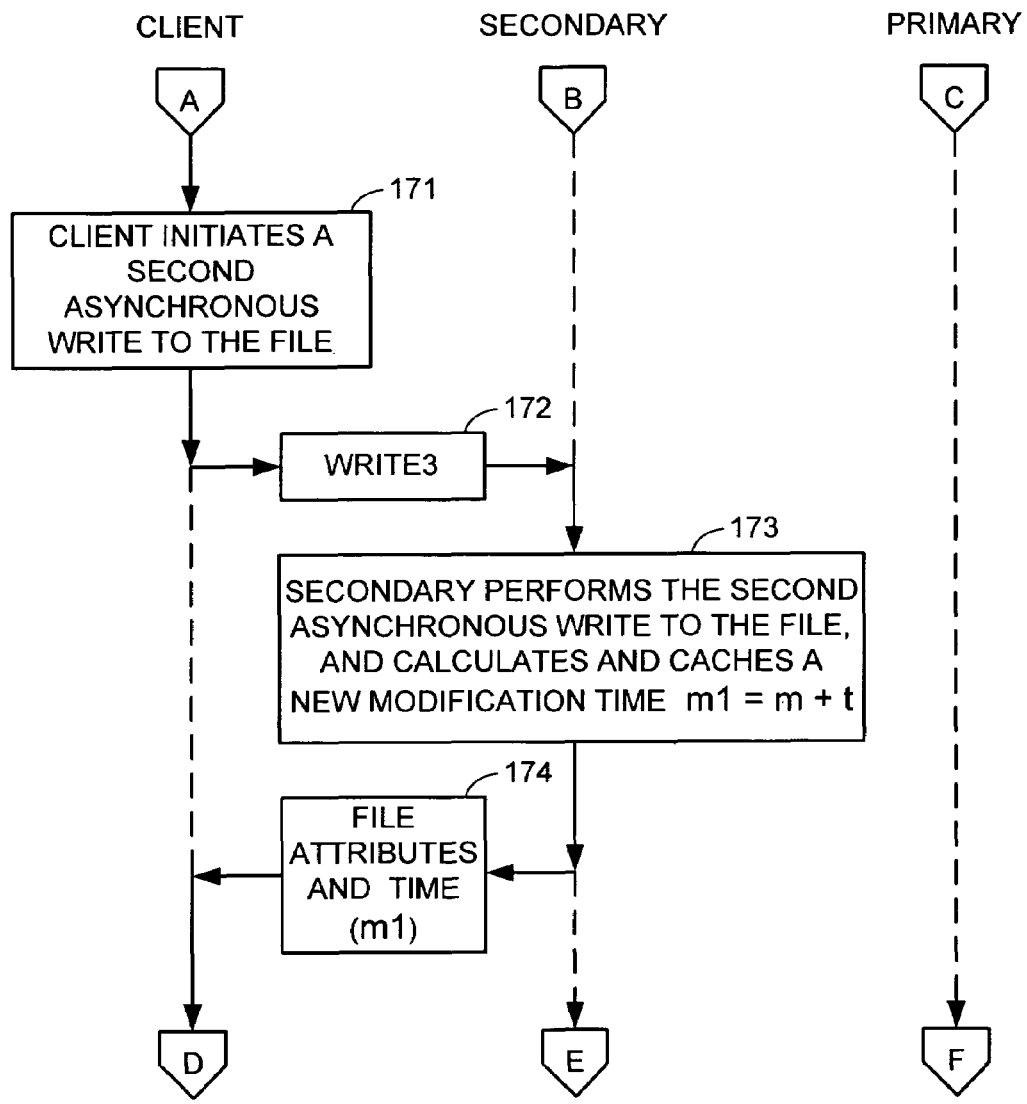
Figure 6:
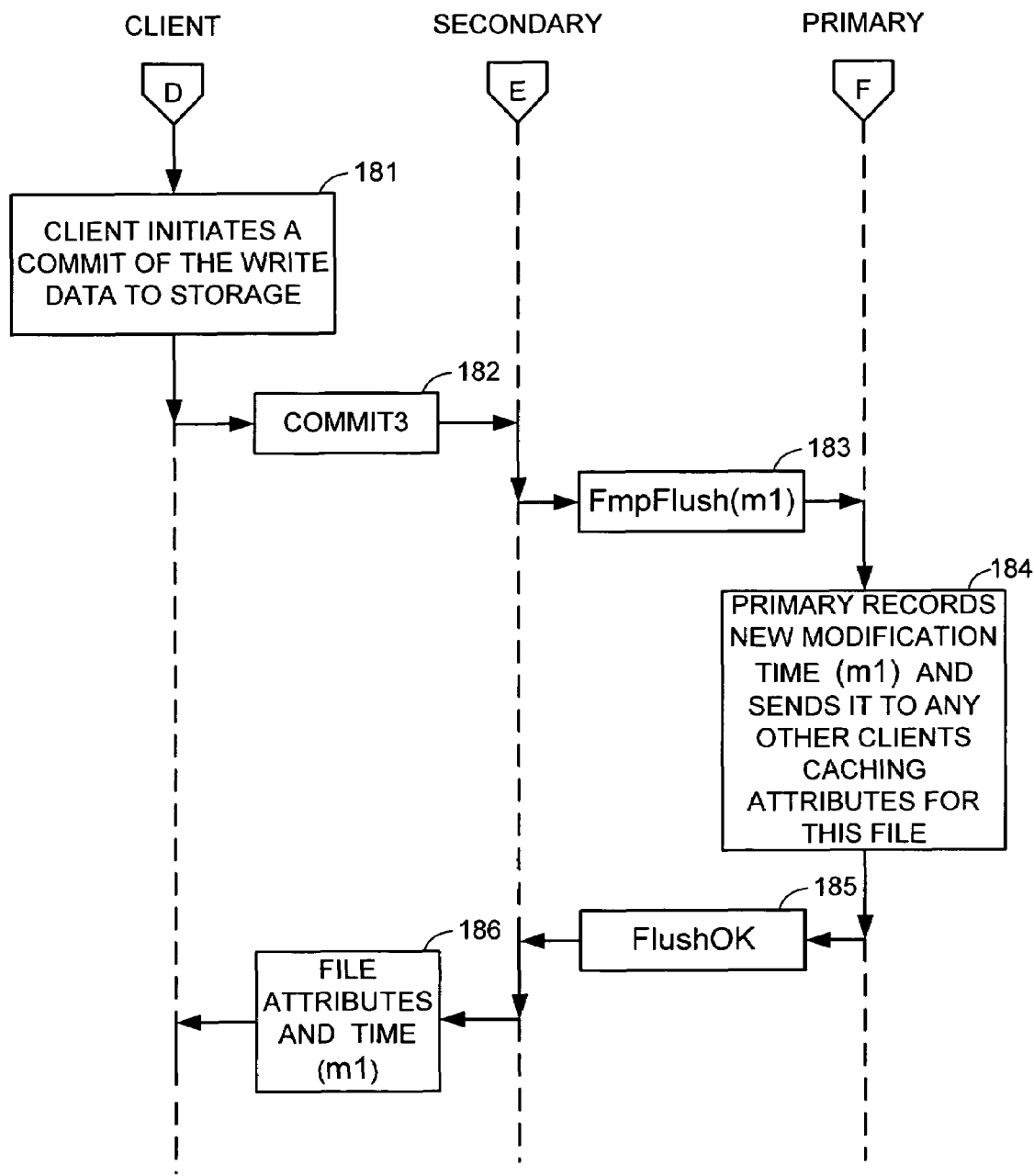

FIGS. 4 to 6 show management of the file-modification time attribute during the file attribute caching protocol of FIG. 3. In a first step 161, the client (131 in FIG. 2) initiates a first asynchronous write to a file by sending a request (WRITE3) 162 to the secondary NFS server (133 in FIG. 2). In response, the secondary sends a "FmpGetAttr" request 163 to the primary NFS server (134 in FIG. 2). In step 164, the primary responds to the "FmpGetAttr" request by reading its clock (140 in FIG. 2) and returning the file attributes and clock time (m) 165. The secondary receives the file attributes and clock time (m). In step 166, the secondary stores the file attributes in its cache (137 in FIG. 2) of file attributes, records the clock time (m) in its local memory (142 in FIG. 2), starts its local timer (t) (139 in FIG. 2), performs the first asynchronous write to the file, and caches the clock time (m) in the cache of file attributes 137 as the file-modification time of the file for the first asynchronous write (WRITE3) 162. The initial value of the local timer is zero. In step 167, the secondary returns file attributes including the file-modification time (m) to the client.

Continuing in FIG. 5, in step 171, the client initiates a second asynchronous write to the file. The client sends a write request (WRITE3) 172 to the secondary NFS file server. In step 173, the secondary performs the second asynchronous write using file attributes in its local cache (137 in FIG. 2), and calculates and caches a new value (m1) for the file-modification time by adding the clock time (m) stored in its local memory (142 in FIG. 2) to the value (t) of its local timer (139 in FIG. 2). This new value (m1) is the file-modification time of this second asynchronous write to the file. The secondary returns the file attributes and the new file-modification time (m1) 174 to the client.

Continuing in FIG. 6, in step 181, the client initiates a commit of the write data to storage. The client sends a commit request (COMMIT3) 182 to the secondary NFS server. The secondary responds by sending a flush request and the new file-modification time (FmpFlush(m1)) 183 to the primary NFS server. In step 184 the primary records the new file-modification time (m1) and sends it to any other clients caching attributes for this file. The primary performs the requested flush operation by logging the metadata changes for the client and then writing the metadata changes for the client to storage (135 in FIG. 2). The primary returns an acknowledgement (FlushOK) 185 to the secondary. The secondary returns file attributes and the file-modification time (m1) 186 to the client.

Figure 7:
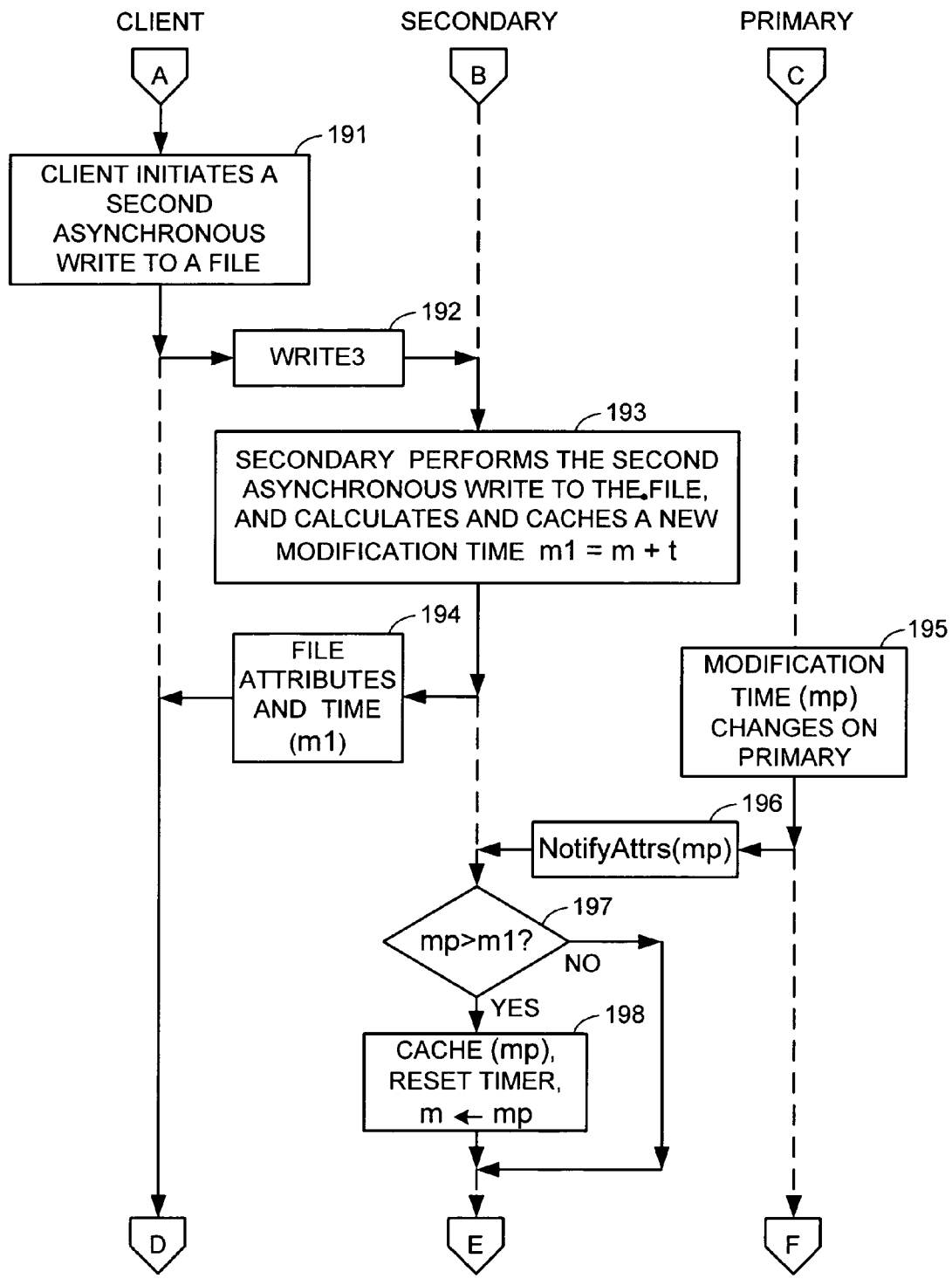
FIG. 7 is an alternative version of the flowchart of FIG. 5, showing modification of the file-modification time attribute in the secondary NFS server in response to notification of an update from the primary NFS server.

It is possible for the primary to notify the secondary of a new value for the file-modification time between the occurrence of the first asynchronous write and the NFS commit. One way that this may happen is shown in FIG. 7, which is a modified version of FIG. 5. In this case, the notification of the new value for the file-modification time occurs after the second asynchronous write. Steps 191 to 194 are similar to steps 171 to step 174 of FIG. 5. In step 195, the file-modification time (mp) changes on the primary NFS server. The primary notifies the secondary by sending a "NotifyAttrs(mp)" message 196, including the new value (mp) of the file-modification time. In step 197, the secondary responds by comparing the new value (mp) to its cached value (m1). If the new value is not greater than its cached value, then the secondary ignores the new value (mp). Otherwise, if (mp) is greater than (m1), then in step 198 the secondary caches the new value (mp) as the most recent file-modification time for the file in its cache of file attributes, resets its timer to zero, and sets the clock time (m) in its local memory (142 in FIG. 2) to the new value (mp).

Figure 8:
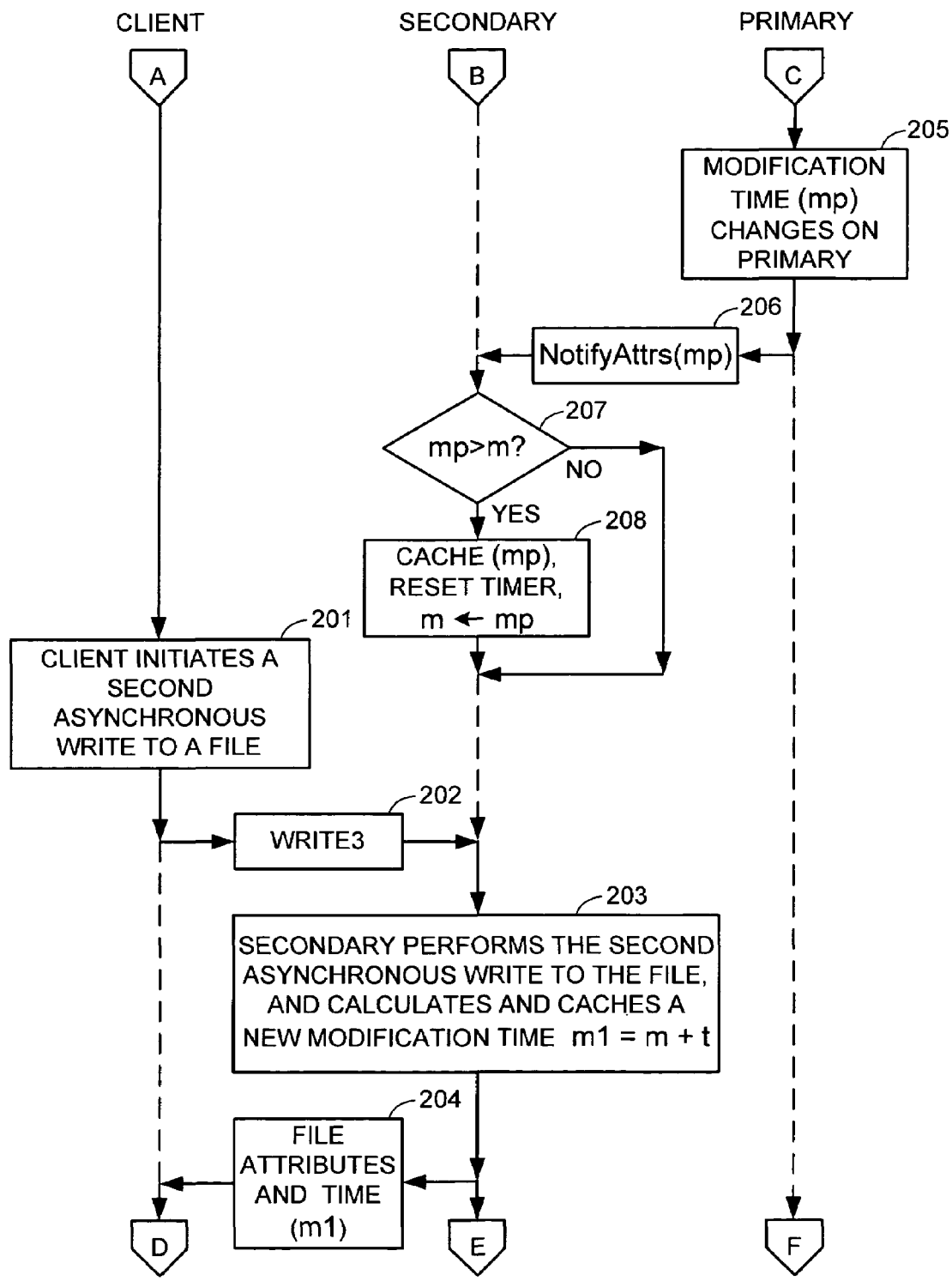
FIG. 8 is another alternative version of the flowchart of FIG. 5, showing modification of the file-modification time attribute in the secondary NFS server in response to notification of an update from the primary NFS server.

FIG. 8 is similar to FIG. 7 but it shows the case where the notification of the new value for the file-modification time occurs before the second asynchronous write. Steps 201 to 204 in FIG. 8 are similar to steps 191 to 194 in FIG. 7, and steps 205 to 208 in FIG. 8 are similar to steps 195 to 198 in FIG. 7.

Sometimes the primary might receive an FMP flush simultaneously from two secondaries. In such a case, only one of the flushes will be processed. The first flush processed will generate a notify message to the other client, which will invalidate the server message number contained in the other client's flush. Thus the other client's flush will be rejected with the error code WRONG_MSG_NUMBER.

The method of FIGS. 4 to 8 ensures consistency of the file-modification time attribute. The first consistency requirement is met because when the client successively writes to a file, the file-modification time is increased by at least the timer value (t) (in step 173 of FIG. 5, step 193 in FIG. 7, and step 203 of FIG. 8).

The second consistency requirement is met because the sequence of file-modification times on the primary server for a file is non-decreasing. In other words, if $m_1, m_2, \ldots, m_i$ is the sequence of file-modification times recorded on the primary server for a file, then $m_1 <= m_2 <= \ldots <= m_i$. This can be proven by induction on the index i. For the base case of i=1, the sequence is non-decreasing because it has one member $m_1$. For the inductive case, consider a new file-modification time $m_{i+1}$, which is being set on the server. There are two possibilities: 1) the server received $m_{i+1}$ from a secondary as the result of an FMP flush, 2) the server received $m_{i+1}$ locally as the result of an NFS commit. For the first case 1), the secondary must have received a notification about the file-modification time $m_i$ before the flush was sent to the server (see steps 195 to 198 in FIG. 7). At that time, the secondary compared $m_i$ to its current in-memory file-modification time $m1=m_x +t$ (see step 197 in FIG. 7 and step 207 in FIG. 8). If $m_i$ was greater, the secondary used $m_i$ as the new basis m1 for its file-modification time and reset its timer (step 198 of FIG. 7 and step 208 of FIG. 8); otherwise it ignored $m_i$. Let d be the delta between the receipt of $m_i$ at the secondary, and the last asynchronous write at the secondary before the fmp flush. Then $$m_i > m_x + t \text{ implies } m_{i+1} = m_i + d, \text{ and}$$

$$m_i <= m_x + t \text{ implies } m_{i+1} = m_x + t + d.$$

Because d is greater than or equal to zero, we conclude $m_{i+1} >= m_i$.

For the second case 2), the argument is the same, because when the primary notifies other secondaries of a new file-modification time $m_i$ for a file, it also checks its own local in-memory file-modification time m1, and if the local time is behind $m_i$, then its in-memory file-modification time is set to $m_i$.

The third consistency requirement is met because the method of FIGS. 4-8 only changes the file-modification time of a file unless data has actually been written to the file. For example, if a client issues an NFS write, and receives $m_i$ as the file-modification time in the post-op attributes, and then issues an NFS commit, it will be guaranteed to see $m_i$ as the file-modification time in the post-op attributes, unless another secondary has issued an FMP flush to the server in the meantime. If such a flush was issued, then the NFS client should invalidate its cache, so this behavior is not problematic. The key fact is that the act of issuing the NFS commit to the secondary server in and of itself does not change the file-modification time of the file, from the point of view of the NFS client. This ensures that the management of the file-modification time will not cause problems for NFS client caching schemes.

It should be apparent that the structure and operation shown in FIGS. 1 to 8 can be modified in various ways that are covered by the appended claims. For example, the NFS servers 133, 134 in FIG. 2 could be geographically remote from each other and remote from the storage 135 and interconnected in a wide-area data network. In addition, the timer 139 in the secondary NFS server 133 could be reset with the clock time (m) from the primary NFS server 134 (or with the updated value (mp) for the file-modification time) instead of being reset to zero, so that the timer 139 would periodically compute a sum of the clock time (m) (or the updated value (mp)) and the time interval (t) measured by the timer.

In view of the above, there has been described a method of maintaining a file-modified time attribute in a multi-processor file server system. To permit multiple unsynchronized processors to update the file-modification time attribute of a file during concurrent asynchronous writes to the file, a primary processor manages access to metadata of the file, and has a clock producing a clock time. A number of secondary processors service client request for access to the file. Each secondary processor has a timer. When the primary processor grants a range lock upon the file to a secondary, it returns its clock time (m). Upon receipt, the secondary starts a local timer (t). When the secondary modifies the file data, it determines a file-modification time that is a function of the clock time and the timer interval, such as a sum (m+t). When the secondary receives an updated file-modification time (mp) from the primary, if mp>m+t, then the secondary updates the clock time (m) to (mp) and resets its local timer.

Although the method of maintaining the file-modified time attribute has been described above with respect to a network file server as shown in FIG. 1 or FIG. 2, it should be understood that the method has general applicability to diverse kinds of file server systems, such as server clusters and storage area networks. For example, when it is desired to permit more than one processor in such a system to change the file-modified time attribute of a file, the method can be used to eliminate a need to synchronize the processors or to require the processors to always obtain the file-modified time attribute from a common clock.

What is claimed is:

1. In a file server system having a clock for producing a clock time and a processor for servicing client requests for access to a file, the processor having a timer for measuring a time interval, a method comprising:
   the processor obtaining the clock time from the clock, and beginning measurement of the time interval with the timer, and
   the processor responding to a request from a client for an asynchronous write to the file by performing an asynchronous write operation with respect to the file, and determining a file-modification time that is a function of the clock time having been obtained from the clock and the time interval measured by the timer, the file-modification time indicating a time of modification of the file by the asynchronous write operation.

2. The method as claimed in claim 1, wherein the file-modification time is a sum of the clock time having been obtained from the clock and the time interval measured by the timer.

3. The method as claimed in claim 1, which includes the processor acknowledging the request from the client for an asynchronous write to the file by returning to the client the file-modification time.

4. The method as claimed in claim 1, which further includes the processor receiving an updated value for the file-modification time after the processor has determined a value for the file-modification time, the processor comparing the updated value to the value that the processor has determined for the file-modification time, and upon finding that the updated value for the file-modification time is greater than the value that the processor has determined for the file-modification time, then the processor resetting the timer and using the updated value for the file-modification time in lieu of the clock time obtained from the clock.

5. The method as claimed in claim 4, wherein the processor stores the clock time having been obtained from the clock in a memory location local to the processor, and the processor uses the updated value for the file-modification time in lieu of the clock time obtained from the clock by replacing the clock time having been obtained from the clock and stored in the memory location local to the processor with the updated value for the file-modification time.

6. The method as claimed in claim 1, which further includes the processor receiving an updated value for the file-modification time after the processor has determined a value for the file-modification time, the processor comparing the updated value for the file-modification time to the value that the processor has determined for the file-modification time, and upon finding the updated value for the file-modification time is less than the value that the processor has determined for the file-modification time, then the processor ignoring the updated value for the file-modification time.

7. In a file server system having a first processor and a second processor for servicing client requests for access to a file, the first processor having a clock producing a clock time, and the second processor having a timer for measuring a time interval, a method comprising:

the second processor responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modification time, the first file-modification time indicating a time of modification of the file by the first asynchronous write operation; and thereafter the secondary processor responding to a second request from the client for an asynchronous write to the file by performing a second asynchronous write operation with respect to the file, and determining a second file-modification time that is a function of is the clock time obtained from the clock of the first processor and the time interval measured by the timer, the second file-modification time indicating a time of modification of the file by the second asynchronous write operation.

8. The method as claimed in claim 7, wherein the file-modification time is a sum of the clock time having been obtained from the clock and the time interval measured by the timer.

9. The method as claimed in claim 7, which includes:

the second processor acknowledging the first request from the client for an asynchronous write to the file by returning to the client the first file-modified time for the file; and the second processor acknowledging the second request from the client for an asynchronous write to the file by returning to the client the second file-modified time for the file.

10. The method as claimed in claim 7, which includes the second processor responding to a request from the client to commit results of the second asynchronous write operation by sending the second file-modification time to the first processor.

11. In a file server system having a first processor and a second processor for servicing client requests for access to a file, the first processor having a clock producing a clock time, and the second processor having a timer for measuring a time interval, a method comprising:

the second processor responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modification time, the first file-modification time indicating a time of modification of the file by the first asynchronous write operation; and thereafter the second processor receiving from the first processor an updated value for the file-modification time, the second processor comparing the updated value for the file-modification time to the first file-modification time, and upon finding that the updated value is greater than the first file-modification time, the second processor resetting the timer; and thereafter the second processor responding to a second request from the client for an asynchronous write to the file by performing a second asynchronous write operation with respect to the file, and determining a second file-modification time that is a sum of the updated value for the file-modification time and the time interval measured by the timer, the second file-modification time indicating a time of modification of the file by the second asynchronous write operation.

12. In a file server system having a primary processor managing metadata of a file, and a secondary processor responding to requests from a client for access to the file, the primary processor having a clock producing a clock time, and the secondary processor having a timer for measuring a time interval, a method comprising:

the secondary processor responding to a first asynchronous write request from the client for writing to the file by obtaining attributes of the file and the clock time from the primary processor, storing the attributes of the file in a cache local to the secondary processor and using the file attributes to perform a first asynchronous write operation with respect to the file, and beginning measurement of the time interval with the timer, and thereafter the secondary processor responding to a second asynchronous write request from the client for writing to the file by using the attributes of the file in the cache local to the secondary processor to perform a second asynchronous write operation with respect to the file, and determining a file-modification time that is a function of the clock time having been obtained from the clock of the primary processor and the interval measured by the timer, the file-modification time indicating a time of modification of the file by the second asynchronous write operation.

13. The method as claimed in claim 12, wherein the file-modification time is a sum of the clock time having been obtained from the clock and the time interval measured by the timer.

14. The method as claimed in claim 12, which includes:

the secondary processor acknowledging the second asynchronous write request from the client by returning to the client the file-modification time as the time when the file was modified by the second asynchronous write operation.

15. The method as claimed in claim 12, which includes:
the secondary processor responding to a request from the client to commit results of the second asynchronous write operation by sending a flush request to the primary processor, the flush request including the file-modification time.

16. The method as claimed in claim 15, which includes the primary processor sending the file-modification time to another client caching attributes for the file.

17. The method as claimed in claim 12, which includes the secondary processor receiving from the primary processor an updated value for the file-modification time after the secondary processor has completed the second asynchronous write operation, the secondary processor comparing the updated value for the file-modification time to the last value for the file-modification time determined by the secondary processor, and upon finding that the updated value for the file-modification time is greater than the last value for the file-modification time determined by the secondary processor, the secondary processor resetting the timer, and using the updated value for the file-modification time in lieu of the clock time having been obtained from the primary processor, and using the updated value for the file-modification time as the most recent value of the file-modification time.

18. The method as claimed in claim 12, which includes the secondary processor receiving from the primary processor an updated value for the file-modification time after the secondary processor has completed the second asynchronous write operation, the secondary processor comparing the updated value for the file-modification time to the last value for the file-modification time determined by the secondary processor, and upon finding that the updated value for the file-modification time is less than the last value for the file-modification time determined by the secondary processor, the secondary processor ignoring the updated value for the file-modification time.

19. In a network file server having a plurality of data mover computers for servicing client requests for access to a file, and a cached disk array for storing data of the file, the data mover computers being coupled to the cache disk array for accessing the data of the file, the data mover computers including a primary data mover computer managing metadata of the file, and a secondary data mover computer that requests metadata of the file from the primary data mover computer, the primary data mover computer having a clock producing a clock time, and the secondary data mover computer having a timer for measuring a time interval, a method comprising:
the secondary data mover computer responding to a first asynchronous write request from a client for writing to the file by obtaining attributes of the file and the clock time from the primary data mover computer, storing the attributes of the file in a cache local to the secondary data mover computer and using the file attributes to perform a first asynchronous write operation with respect to the file, and using the clock time as a first file-modification time indicating a time of modification of the file by the first asynchronous write operation; and thereafter
the secondary data mover computer responding to a second asynchronous write request from the client for writing to the file by using the attributes of the file in the cache local to the secondary data mover computer to perform a second asynchronous write operation with respect to the file, and determining a second file-modification time that is a function of the clock time having been obtained from the primary data mover and the time interval measured by the timer, the second file-modification time indicating a time of modification of the file by the second asynchronous write operation.

20. The method as claimed in claim 19, wherein the second file-modification time is a sum of the clock time having been obtained from the primary data mover and the time interval measured by the timer.

21. The method as claimed in claim 19, wherein:
the secondary data mover computer uses the clock time as a first filemodification time by acknowledging the first asynchronous write request from the client by returning to the client the clock time as the time when the file was modified by the first asynchronous write operation, and
the secondary data mover computer acknowledges the second asynchronous write request from the client by returning to the client the second file-modification time as the time when the file was modified by the second asynchronous write operation.

22. The method as claimed in claim 19, which includes:
the secondary data mover computer responding to a request from the client to commit results of the second asynchronous write operation by sending a flush request to the primary data mover computer, the flush request including the second file-modification time.

23. The method as claimed in claim 22, which includes the primary data mover computer sending the second file-modification time to another client caching attributes for the file.

24. The method as claimed in claim 19, which includes the secondary data mover computer receiving from the primary data mover computer an updated value for the file-modification time for the file after the secondary data mover computer has completed the first asynchronous write operation, the secondary data mover computer comparing the updated value for the file-modification time for the file to the last value determined by the secondary data mover for the file-modified time for the file, and upon finding that the updated value for the file-modification time for the file is greater than the last value determined by the secondary data mover for the file-modified time for the file, the secondary data mover computer resetting the timer, using the updated value for the file-modification time in lieu of the clock time having been obtained from the primary data mover computer, and using the updated value for the file-modification time for the file as the most recent value for the file-modification time for the file.

25. The method as claimed in claim 19, which includes the secondary data mover computer receiving from the primary data mover computer an updated value for the file-modification time for the file after the secondary data mover computer has completed the first asynchronous write operation, the secondary data mover computer comparing the updated value for the file-modification time for the file to the last value determined by the secondary data mover for the file-modified time for the file, and upon finding that the updated value for the file-modification time for the file is less than the last value determined by the secondary data mover for the file-modified time for the file, the secondary data mover computer ignoring the updated value for the file-modification time.

26. A file server system having a clock for producing a clock time and a processor for servicing client requests for access to a file, the processor having a timer for measuring a time interval;
the processor being programmed for obtaining the clock time from the clock, and beginning measurement of the time interval with the timer, and
the processor being programmed for responding to a request from a client for an asynchronous write to the file by performing an asynchronous write operation with respect to the file, and determining a file-modification time that is a function of the clock time having been obtained from the clock and the time interval measured by the timer, the file-modification time indicating a time of modification of the file by the asynchronous write operation.

27. The file server system as claimed in claim 26, wherein the file-modification time is a sum of the clock time having been obtained from the clock and the time interval measured by the timer.

28. The file server system as claimed in claim 26, wherein the processor is programmed to acknowledging the request from the client for an asynchronous write to the file by returning to the client the file-modification time.

29. The file server system as claimed in claim 26, wherein the processor is programmed for receiving an updated value for the file-modification time after the processor has determined a value for the file-modification time, comparing the updated value for the file-modification time to the value that the processor has determined for the file-modification time, and upon finding the updated value for the file-modification time is greater than the value that the processor has determined for the file-modification time, resetting the timer and using the updated value for the file-modification time in lieu of the clock time having been obtained from the clock.

30. The file server system as claimed in claim 29, wherein the processor is programmed for storing the clock time having been obtained from the clock in a memory location local to the processor, and for using the updated value for the file-modification time in lieu of the clock time having been obtained from the clock by replacing the clock time stored in the memory local to the processor with the updated value for the file-modification time.

31. The file server system as claimed in claim 26, wherein the processor is programmed for receiving an updated value for the file-modification time after the secondary processor has determined a value for the file-modification time, comparing the updated value to the value that the processor has determined for the file-modification time, and ignoring the updated value for the file-modification time upon finding the updated value for the file-modification time is less than the value that the secondary processor has determined for the file-modification time.

32. A file server system comprising:
a first processor and a second processor for servicing client requests for access to a file, the first processor having a clock for producing a clock time, and the second processor having a timer for measuring a time interval;
the second processor being programmed for responding to a first request from a client for an asynchronous write to the file by obtaining the clock time from the clock of the first processor, beginning measurement of the time interval with the timer, performing a first asynchronous write operation with respect to the file, and using the clock time obtained from the clock of the first processor as a first file-modificationtime, the first file-modification time indicating a time of modification of the file by the first asynchronous write operation; and the second processor being programmed for responding to a second request from the client for an asynchronous write to the file by performing a second asynchronous write operation with respect to the file, and determining a second file-modification time that is a function of the clock time obtained from the clock of the first processor and the time interval measured by the timer, the second file-modification time indicating a time of modification of the file by the second asynchronous write operation.

33. The file server system as claimed in claim 32, wherein the second file-modification time is a sum of the clock time obtained from the clock and the time interval measured by the timer.

34. The file server system as claimed in claim 32, wherein:
the second processor is programmed to use the clock time obtained from the clock of the first processor as a first file-modification time by acknowledging the first request from the client for an asynchronous write to the file by returning to the client the clock time obtained from the clock of the first processor as the time when the file was modified by the first asynchronous write operation, and
the second processor is programmed to acknowledge the second request from the client for an asynchronous write to the file by returning to the client the second file-modification time as the time when the file was modified by the second asynchronous write operation.

35. The file server system as claimed in claim 32, wherein the second processor is programmed for responding to a request from the client to commit results of the second. asynchronous write operation by sending the second file-modification time to the first processor.

36. A file server system comprising:
a first processor and a second processor for servicing client requests for access to a file, the first processor having a clock for producing a clock time, and the second processor having a timer for measuring a time interval;
the second processor being programmed for responding to a first request from a client for an asynchronous write to the file by obtaining the clock time from the clock of the first processor, beginning measurement of the time interval with the timer, and performing a first asynchronous write operation with respect to the file, and using the clock time obtained from the clock of the first processor as a first file-modification time indicating a time of modification of the file by the first asynchronous write operation; and
the second processor being programmed for receiving from the first processor an updated value for the file-modification time, for comparing the updated value to the first file-modification time, and upon finding that the updated value is greater than the first file-modification time, for resetting the timer; and
the second processor being programmed to respond to a second request from the client for an asynchronous write to the file by performing a second asynchronous write operation with respect to the file, and determining a second file-modification time that is a sum of the updated value for the file-modification time and the time measured by the timer, the second file-modification time indicating a time of modification of the file by the second asynchronous write operation.

37. A file server system comprising:
a primary processor managing metadata of a file, and a secondary processor responding to requests from a client for access to the file, the primary processor having a clock for producing a clock time, and the secondary processor having a timer for measuring a time interval;
the secondary processor being programmed for responding to a first asynchronous write request from the client for writing to the file by obtaining attributes of the file and the clock time from the primary processor, storing the attributes of the file in a cache local to the secondary processor and using the file attributes to perform a first asynchronous write operation with respect to the file, and beginning measurement of the time interval with the timer; and the secondary processor being programmed for responding to a second asynchronous write request from the client for writing to the file by using the attributes of the file in the cache local to the secondary processor to perform a second asynchronous write operation with respect to the file, and determining a file-modification time that is a function of the clock time having been obtained from the clock of the primary processor and the time interval measured by the timer, the file-modification time indicating a time of modification of the file by the second asynchronous write operation.

38. The file server system as claimed in claim 37, wherein the file-modification time is a sum of the clock time having been obtained from the primary processor and the time interval measured by the timer.

39. The file server system as claimed in claim 37, wherein:
the secondary processor is programmed for acknowledging the second asynchronous write request from the client by returning to the client the file-modification time as the time when the file was modified by the second asynchronous write operation.

40. The file server system as claimed in claim 37, wherein the secondary processor is programmed for responding to a request from the client to commit results of the second asynchronous write operation by sending a flush request to the primary processor, the flush request including the file-modification time.

41. The file server system as claimed in claim 40, wherein the primary processor is programmed to send the file-modification time to other clients caching attributes for the file.

42. The file server system as claimed in claim 37, wherein the secondary processor is programmed for receiving from the primary processor an updated value for the file-modification time after the secondary processor has completed the second asynchronous write operation, for comparing the updated value for the file-modification time to the last value for the file-modification time determined by the secondary processor, and upon finding that the updated value for the file-modification time is greater than the last value for the file-modification time determined by the secondary processor, for resetting the timer, and using the updated value for the file-modification time in lieu of the clock time having been obtained from the primary processor, and using the updated value for the file-modification time as the most recent value of the file-modification time.

43. The file server system as claimed in claim 37, wherein the secondary processor is programmed for receiving from the primary processor an updated value for the file-modification time after the secondary processor has completed the second asynchronous write operation, for comparing the updated value for the file-modification time to the last value for the file-modification time determined by the secondary processor, and upon finding that the updated value for the file-modification time is less than the last value for the file-modification time determined by the secondary processor, for ignoring the updated value for the file-modification time.

44. A network file server comprising:
a plurality of data mover computers for servicing client requests for access to a file, and a cached disk array for storing data of the file, the data mover computers being coupled to the cached disk array for accessing the data of the file, the data mover computers including a primary data mover computer programmed for managing metadata of the file, and a secondary data mover computer programmed for requesting metadata of the file from the primary data mover computer, the primary data mover computer having a clock for producing a clock time, and the secondary data mover computer having a timer for measuring a time interval;

the secondary data mover computer being programmed for responding to a first asynchronous write request from a client for writing to the file by obtaining attributes of the file and the clock time from the primary data mover computer, storing the attributes of the file in a cache local to the secondary data mover computer and using the file attributes to perform a first asynchronous write operation with respect to the file, beginning measurement of the time interval with the timer, and using the clock time as a first file-modification time, the first file-modification time indicating a time of modification of the file by the first asynchronous write operation; and the secondary data mover computer being programmed for responding to a second asynchronous write request from the client for writing to the file by using the attributes of the file in the cache local to the secondary data mover computer to perform a second asynchronous write operation with respect to the file, and determining a second file-modification time that is a function of the clock time having been obtained from the primary data mover and the time interval measured by the timer, the second file-modification time indicating a time of modification of the file by the second asynchronous write operation.

45. The network file server as claimed in claim 44, wherein the second file-modification time is a sum of the clock time having been obtained from the primary data mover and the time interval measured by the timer.

46. The network file server as claimed in claim 44, wherein:
the secondary data mover computer is programmed for using the clock time as a first file-modification time by acknowledging the first asynchronous write request from the client by returning to the client the clock time as the time when the file was modified by the first asynchronous write operation, and the secondary data mover computer is programmed for acknowledging the second asynchronous write request from the client by returning to the client the second file-modification time as the time when the file was modified by the second asynchronous write operation.

47. The network file server as claimed in claim 44, wherein the secondary data mover computer is programmed for responding to a request from the client to commit results of the second asynchronous write operation by sending a flush request to the primary data mover computer, the flush request including the second file-modification time.

48. The network file server as claimed in claim 47, wherein the primary data mover computer is programmed for sending the second file-modification time to other clients caching attributes for the file.

49. The network file server as claimed in claim 44, wherein the secondary data mover computer is programmed for receiving from the primary data mover computer an updated value for the file-modification time for the file after the secondary data mover computer has completed the first asynchronous write operation, for comparing the updated value for the file-modification time for the file to last value determined by the secondary data mover for the file-modified time for the file, and upon finding that the updated value for the file-modification time for the file is greater than the last value determined by the secondary data mover for the file-modified time for the file, for resetting the timer, using the updated value for the file-modification time for the file in lieu of the clock time having been obtained from the primary data mover computer, and using the updated value for the file-modified time for the file as the most recent value for the file-modification time for the file.

50. The network file server as claimed in claim 44, wherein the secondary data mover computer is programmed for receiving from the primary data mover computer an updated value for the file-modification time for the file after the secondary data mover computer has completed the first asynchronous write operation, for comparing the updated value for the file-modification time for the file to last value determined by the secondary data mover for the file-modified time for the file, and upon finding that the updated value for the file-modification time for the file is less than the last value determined by the secondary data mover for the file-modified time for the file, for ignoring the updated value for the file-modification time for the file.

* * * * *

UNITED STATES PATENT AND TRADEMARK OFFICE
CERTIFICATE OF CORRECTION

| | |
|---|---|
| PATENT NO. | : 7,412,496 B2 |
| APPLICATION NO. | : 10/645976 |
| DATED | : August 12, 2008 |
| INVENTOR(S) | : Stephen A. Fridella et al. |

It is certified that error appears in the above-identified patent and that said Letters Patent is hereby corrected as shown below:

In Claim 7, Col. 13, line 47, "of is the" is changed to --of the--.

In Claim 28, Col. 17, lines 14-15, "retuming" is changed to --returning--.

In Claim 32, Col. 17, line 58, "file-modificationtime" is change to --file-modification time--.

Signed and Sealed this

Fourth Day of November, 2008

JON W. DUDAS
*Director of the United States Patent and Trademark Office*